Jan. 27, 1931.  L. A. LEGROS  1,790,431
FLEXIBLE TRACK FOR WHEELS
Filed June 26, 1925   2 Sheets-Sheet 1

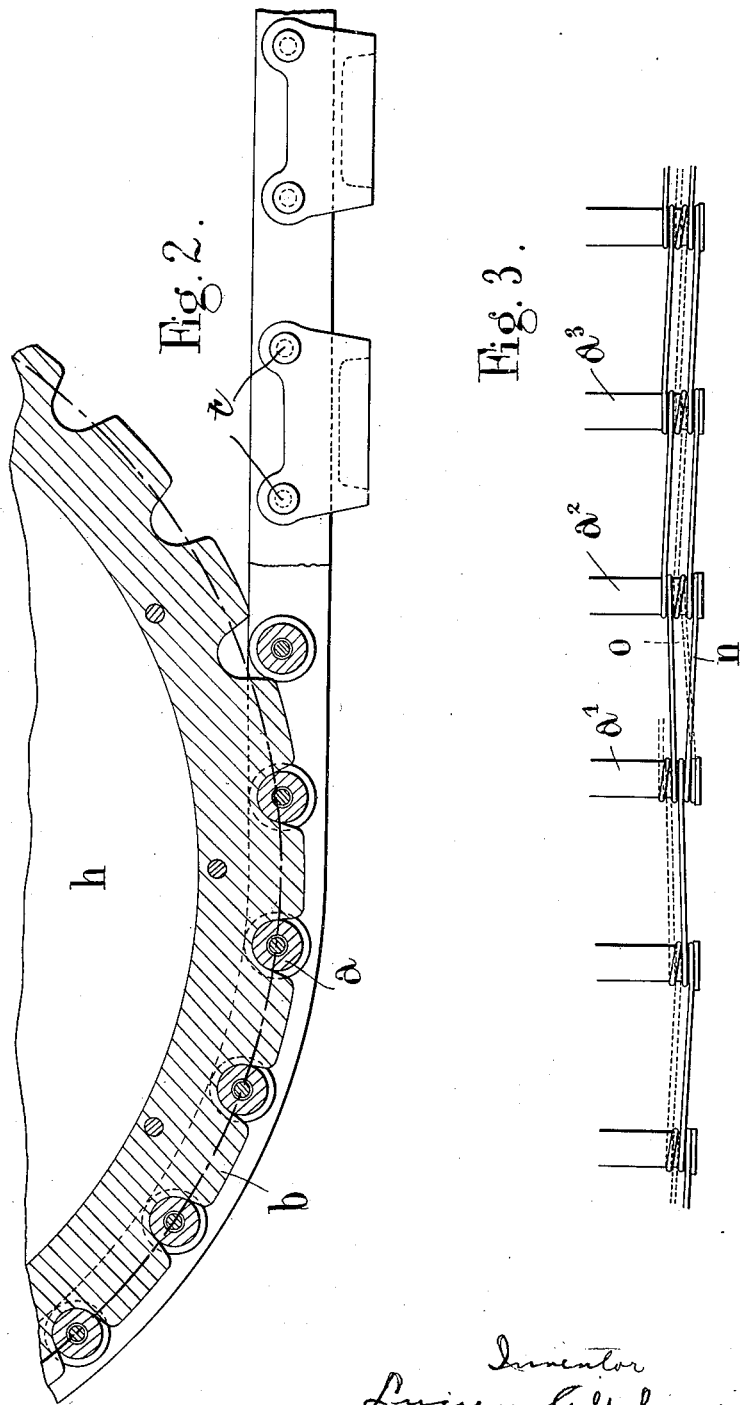

Patented Jan. 27, 1931

1,790,431

UNITED STATES PATENT OFFICE

LUCIEN ALPHONSE LEGROS, OF ACTON, LONDON, ENGLAND

FLEXIBLE TRACK FOR WHEELS

Application filed June 26, 1925, Serial No. 39,854, and in Great Britain June 30, 1924.

This invention relates to flexible tracks of the type incorporating elements capable of being driven positively by a driving sprocket and embodying a continuous band as distinct from that embodying a plurality of rigid sections which are mutually articulated.

This invention has for its object to provide an improved or simplified flexible track of this type.

The present invention consists in a flexible track of the type indicated above including a plurality of rigid ribs embedded transversely in the belt and mutually coupled in the direction of the length of the belt by flexible wire tension elements which are lapped around said ribs so as to prevent slippage.

The invention also consists in a flexible track as set forth above wherein the flexible wire tension elements are formed of a continuous length of stranded wire rope.

The invention also consists in a flexible track as set forth above including a fabric strip passed under and over the connecting elements to increase the bonding with rubber subsequently vulcanized into position.

Referring to the accompanying drawings:—

Figure 2 is a side view corresponding to Figure 1 showing the track and part of sprocket wheel rim in section.

Figure 3 is a diagram showing a convenient method of winding the wires.

Figure 1:
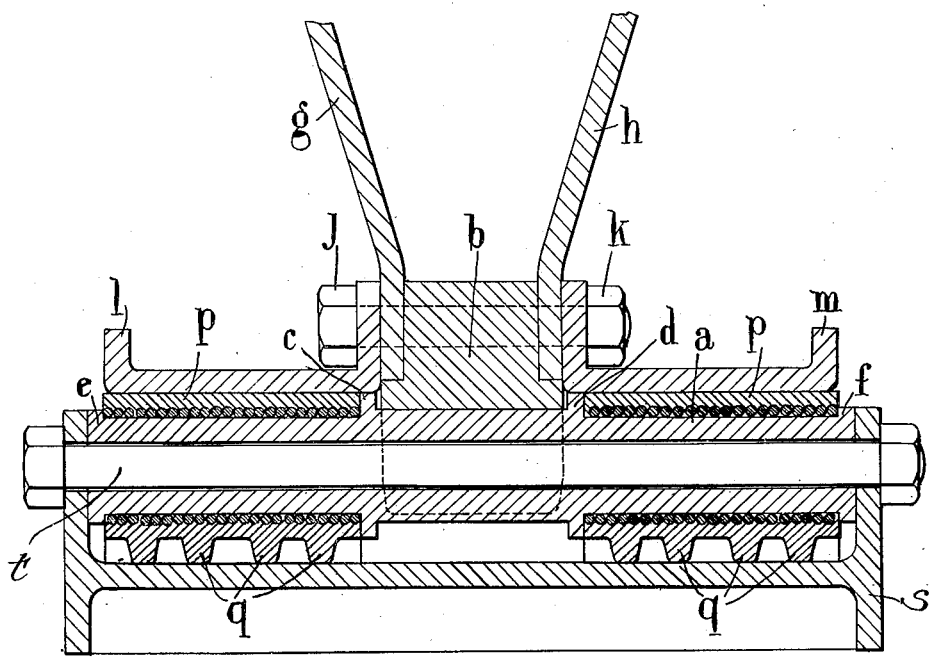
Figure 1 is a vertical transverse sectional view through the rim of a sprocket wheel and flexible track in accordance with the present invention.

In carrying the invention into effect in one form by way of example, as illustrated in Figures 1 and 2, I provide a plurality of rigid transverse ribs $a$ circular in cross section formed conveniently of case-hardened steel, which may be hollow, as shown, and may be reinforced if desired. The central portions of the ribs are adapted to engage a driving sprocket $b$, two guide flanges $c$, $d$ being formed on each rib in order to locate the ribs in relation to the teeth of the sprocket, and two more flanges $e$, $f$ being provided at the extreme ends of the ribs.

The sprocket ring $b$ is clamped between two discs $g$, $h$ by bolts $j$ and nuts $k$, two pulley portions $l$, $m$ being also clamped in position by these bolts and nuts as shown.

The ribs are interconnected by means of steel wire which in order to possess the desired flexibility may be wire cord or wire rope formed of a plurality of wires of small diameter.

Figure 4:
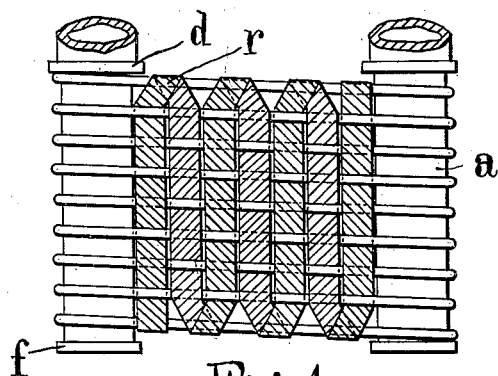
Figure 4 is a fragmentary view of a detail.

The wire is wound upon the ribs in the manner indicated in Figure 3, commencing with one and a half laps placed upon the end of one of the ribs (e. g. $a'$, Figure 3). The end $n$ of the wire is then lapped once round the succeeding ribs $a^2$, $a^3$, etc., and the end $o$ is dealt with in a similar manner, except that it is lapped in the opposite directions around the ribs as shown. This process is continued until the whole length between a pair of flanges $e$ and $c$ or $d$ and $f$ is completed, whereupon the two ends are firmly secured to each other, e. g. by twisting, lapping, soldering, welding. It will be understood that the ribs are held in position by some temporary means to enable the wires to be applied without displacing the ribs. Upon completion of both sets of continuous windings, fabric $r$ is passed under and over the wires as indicated in Figure 4 so as to increase the bonding with the rubber compound $p$ which is subsequently vulcanized in the position shown in Figure 1. The rubber portions $p$ with their treads $q$ constitute the surfaces which come into contact with the ground.

By lapping the wire $n$ in the above described manner circumferential slippage between the wire and the external surface of the ribs $a$ with its attendant heat generation and wear is entirely avoided, although great flexibility of the belt is secured.

If desired driving spuds $s$ may be attached to the track as illustrated in Figures 1 and 2, these being attached by means of bolts $t$ passing through the ribs $a$.

It will be appreciated that since the track described above is driven by a toothed sprocket engaging the centre portions of the cross ribs, friction is not relied upon for the drive of the track and transport of heavy loads may therefore be dealt with successfully, and owing to the combination of this feature with a continuous type of track surface specially difficult surfaces, such as sand areas, may be traversed successfully.

Having now described my invention, what I claim as new and desire to secure by Letters Patent is:

1. A flexible track comprisng a flexible belt and a plurality of rigid ribs embedded transversely in the belt and mutually coupled in the direction of the length of the belt by flexible wire tension elements which are lapped completely around said ribs so as to prevent slippage.

2. A flexible track as claimed in claim 1, wherein the flexible wire tension elements are formed of a continuous length of stranded wire rope.

3. A flexible track comprising a vulcanized rubber belt, a plurality of rigid ribs embedded transversely in said belt and mutually coupled in the direction of the length of the belt by flexible wire tension elements which are lapped completely around said ribs so as to prevent slippage and a fabric strip passed under and over the connecting elements to increase the bonding.

In testimony whereof I have signed my name to this specification.

LUCIEN ALPHONSE LEGROS.